United States Patent Office 3,547,632
Patented Dec. 15, 1970

3,547,632

METHOD OF LITHOGRAPHIC REPRODUCTION AND SOLUTION TO RENDER IMAGE AREAS OLEOPHILIC

Gale F. Nadeau, Jr., Rochester, N.Y., assignor to Eastman Kodak Company, Rochester, N.Y., a corporation of New Jersey No Drawing. Filed Nov. 16, 1967, Ser. No. 683,488
Int. Cl. B41m *1/106;* C09k *3/18;* G03f *7/06*
U.S. Cl. 96—33 11 Claims

ABSTRACT OF THE DISCLOSURE

The press latitude of lithographic printing plates having gelatin printing surfaces is widened by contacting the printing surface prior to or during the printing operation with aqueous solutions containing polyalkylene glycols, e.g., a buffered aqueous solution containing lauryl sulfate and polypropylene glycol.

This invention relates to lithographic printing plates. In one aspect, this invention relates to lithographic printing plates having printing surfaces which are substantially all gelatin, especially printing plates of the type disclosed in U.S. Reissue Pat. 25,885 to Edward C. Yackel and Thomas I. Abbot.

Lithographic printing plates and printing therefrom with the use of a lithographic printing press involves plates having printing surfaces which are differentially ink-receptive when moistened. Usually the plate includes characters or designs which are receptive to greasy printing ink and background areas which repel ink when the areas are moistened with water. Printing from such a plate does not depend upon printing characters which are either substantially above or below the background as would be the case with the relief or intaglio printing plates. Because of the substantial planar nature of the printing surface, obtaining tone-free printed images by using the plates in the conventional manner is often difficult. This is especially true when the printing surface of the plate is substantially uniform in nature, for example, a plate having a printing surface which is sbustantially all gelatin.

With lithographic plates having substantially all gelatin printing surfaces, the printing effectiveness depends upon a portion of the surface, usually the characters, being rendered oleophilic (usually tanned or hardened) with the remainder, usually the background, being substantially hydrophilic (usually relatively unhardened). The oleophilic portions of the gelatin surface are, of course, receptive to greasy printing ink. However, unless the hydrophilic areas of the plate are sufficiently moistened and the general process variables, e.g., types of inks, ink-water balance, initial exposure of plate, compositions of plates, types of materials to be reproduced, press speed etc. are carefully controlled and/or balanced, the supposedly hydrophilic areas of the plates will also receive greasy printing ink. As a result low quality or unacceptable prints are produced. For example, normally with all-gelatin or gelatin-residue surface printing plates only high-tack, high-viscosity printing inks can be utilized. Although low-viscosity inks which are generally utilized as lithographic inks would form an advantageous alternative, they normally perform very poorly with the gelatin plates described above and usually result in heavy toning. Similarly, the other described variables, inter alia, pose undesirable limitations on printing with such plates. Accordingly, it has heretofore been nearly impossible to utilize such plates in reproducing copies of such things as engineer's drawings, etc., where there is a small density difference between the image and background.

Despite the difficulties of such systems, the gelatin surface printing plate and processes associated therewith offer a combination of speed of production, i.e., by photographic methods, low cost, and potential quality which has led to a considerable consumer demand. Consequently, continual efforst are being made to find materials which will reduce the criticality associated with the process variables by, e.g., facilitating the repulsion of greasy printing inks by the hydrophilic (background) portions of the gelatin, which accordingly will result in printed images of substantially reduced toning, scumming, etc. Such a reduction in the criticality associated with the variables (widening the press latitude) which allow the printer to effectively copy a wider variety of subjects, to use a wider variety of inks, to use a single plate for longer press runs with less concern for the ink-water balance, and, in general, to waste less press time in making minor process alterations and running off unacceptable copy.

It is, therefore, one object of this invention to provide methods and materials utilized in printing from lithographic plates. Another object is to provide methods and materials for utilization in printing from lithographic plates having printing surfaces of substantially all gelatin. Another object is to provide materials which will widen the press latitude of lithographic plates having gelatin printing surfaces. Still another object is to provide materials which will tend to reduce the susceptibility of hydrophilic areas to accept ink without unduly affecting the areas which are intended to accept ink.

These and other objects which will become apparent by the following disclosure are accomplished by contacting lithographic plates with solutions containing polyglycols in combination with specified anionic surfactants. Such solutions have special advantafges when contacting plates which are prepared in accordance with the methods described in U.S. Reissue Pat. 25,885, mentioned above, as well as those prepared in accordance with the methods described in U.S. Pat. 3,146,105 to Kenneth L. Risley and William E. Guthrie, the disclosures of which are incorporated herein by reference.

In preparation of lithographic plates of the type described above for utilization in lithographic printing processes, the plates are exposed to images and processed in an advantageously short period of time. The plates are then usually moistened prior to supplying ink to the plate surface. (The processed plates are often dried on a drum. A wet plate directly out of the stop bath may go directly on the press but this type of operation is not common.) An especially advantageous solution for this initial moistening is a solution consisting essentially of polyglycols particularly .5–40 grams of polypropylene glycols having molecular weights averaging about 400 to about 1,200 per liter of water.

Next, to maintain the plates in the "wet" condition, fountain solutions are usually employed either simultaneously with or prior to each inking step. These fountain solutions are also applied utilizing conventional methods, e.g., wet cylindrical fabric covered roller in rolling contact with the plates, etc. Due to the normal criticality of the water-ink balance, the wetting or fountain solutions also tend to either cause toning or contribute to resultant toning, or at least fail to prevent toning, so that the background areas of the plate tend to be contaminated with ink.

In the past, a number of various components have been inserted into the fountain solutions which are primarily aqueous solutions. Although such addenda have often improved the printing results in isolated systems, the other variables in the printing operation still had to be controlled within narrow boundaries or scumming or toning would result. Additionally, even though some addenda tend to reduce scumming, they also tend to reduce the receptivity of the image areas to ink and, as a result, images of insufficient density are printed. The printed areas are often broken in appearance of may disappear completely during a press run.

According to the present invention, the tendency of such lithographic plates to result in toning or scumming is substantially decreased without unduly reducing the density of the printed image by employing fountain solutions containing, inter alia, polyglycols, especially polyglycols having average molecular weights of from 400 to 6,000 and anionic surfactants containing a sulfo acid, i.e., sulfonate or sulfate moiety and an alkyl moiety wherein the alkyl group is a saturated chain of 11–16 carbon atoms.

The polyglycols most efficaciously utilized in the practice of the present invention are polyalkylene glycols wherein the alkylene moiety is a carbon chain of two to three carbon atoms, especially polyethylene glycols and polypropylene glycols having molecular weights averaging in the range of from 400 to 6,000. Exceptional results are obtained with polypropylene glycols having molecular weights averaging from about 400 to about 4,000 with a preferred range being about 400 to about 1,200. Good results are also obtained with polyethylene glycols having molecular weights of from about 1,200 to about 6,000 although molecular weights of 20,000 and even higher may be used.

It is noted that satisfactory results may be obtained with variations of structure of the polyglycols. For example, such polyglycols, e.g., polyethylene glycol-polypropylene glycol block copolymers are effective according to the present invention. Also, replacing the hydrogen of terminal hydroxy groups with relatively insignificant alkyl groups, i.e., lower alkyl groups, e.g., methyl, ethyl, etc., results in effective compositions according to the present invention. Thus, the term polyalkylene glycols in the context of the instant invention encompasses such variations as monomethyl esters, etc., as described above.

The anionic surfactant employed may be of complex structure, but the alkyl group is advantageously straight chain and should not be separated from the sulfo acid group by more than 5 atoms of which no more than 1 atom in the chain should be hetero, i.e., other than carbon. Advantageously, the anionic surfactants are relatively simple salts of alkyl sulfates and/or alkanoyl N-methyl taurines wherein the alkyl and alkanoyl groups each contain from 12 to 16 carbon atoms. Especially effective salts are alkali metal, especially sodium salts of lauryl sulfate and lauroyl N-methyl taurine.

The ratio of polyglycol to anionic surfactant may vary with the specific compounds chosen and the specific system but generally it is advantageous to utilize a weight of polyglycol in considerable excess of the weight of anionic surfactant employed. Ratios as high as about 30–500 parts polyglycol to one part anionic surfactant are not uncommon. Fountain solutions which remarkably reduce the criticality of the above-described process variable results when polypropylene glycol (average molecular weight 400–1,200) and lauroyl N-methyl taurine are utilized in the fountain in ratios of from about 500–33 to 1. The ingredients when in use are more advantageously in the solution at concentrations varying from about 0.1–1% by weight polyglycol and about .001–.01% anionic surfactant. Although aqueous solutions containing polyglycols and anionic surfactants form highly effective fountain solutions in absence of additional ingredients, it is generally desirable to include various other ingredients, e.g., citric acid, lactic acid, or tartaric acid, $KH_2PO_4$, etc., as buffers to maintain pH at about 3–5 and especially about 4.

It is to be noted that the various steps and compositions in the printing process using all-gelatin printing surface lithographic printing plates are inter-connected. For example, because of the continuous nature of the process, materials from the wetting solutions may eventually end up in the fountain solutions as well as in the inks. Similarly, fountain solutions may extract some surfactant from ink and the inks may extract some of the components from the fountain solutions. Therefore, the incorporation of specific amounts of polyglycol and sulfonate, etc., in a fountain solution will not mean that the concentration will remain unchanged. The concentration may be increased or decreased depending upon the relative concentration of the ingredients in the selected ink, wetting, fountain formulations, etc.

Because of this relationship, it is desirable to select components which will be useful in all phases of the system when setting up the printing press and plates for the printing operation. That is, the materials chosen for the fountain solutions should have beneficial rather than detrimental effects on the other compositions associated with the process. This appears to be one of the outstanding advantages of utilizing the compositions and methods of the present invention. The compositions of the present invention appear to be universally useful throughout these various solutions and to a significantly large degree reduce the criticality heretofore associated with the printing process variables. The incorporation of the selected components of the present invention into one of the components will thereby not destroy but possibly enhance the effectiveness of the other solutions or the ink in the chain of the printing operation.

It is further noted that the concentration of ingredients mentioned previously relate to concentrations which most efficaciously can be employed in the printing operations per se. It is recognized that the components for the printing operations can be sold as concentrates to decrease the enormous cost that would be involved in shipping the water along with the concentrated solution. It is readily apparent that the most desirable solutions from the shipping standpoint will be devoid of water or substantially devoid of water. This would, however, leave the printer with the undesirable task of having to mix all the ingredients. A suitable compromise is found by packaging and shipping the various components as concentrates, i.e., in the case of the rewet and fountain solutions as concentrated aqueous solutions. Of course, the solubility characteristics of the various polypropylene glycols does vary and to some extent the economics involved may dictate the choice of the specific molecular weight desired.

The following examples are intended to illustrate the advantages of our invention but not to limit it in any way.

EXAMPLE 1

A lithographic element is prepared, exposed, and processed in accordance with the teachings of U.S. Pat. No. 3,146,105. The dry plate is positioned on a lithographic press, e.g., a Multilith 1250 Offset Duplicator Press. The plate is rewet by contacting the plate with a sponge saturated with a solution of 1 gram polypropylene glycol (molecular weight about 1,200) per liter of water. The plate is effectively rewet after only three to six press revolutions. The press is then utilized for printing using a commercial glycerin-phosphate fountain solution and VanSon Holland ink. Bad scumming is encountered such that few if any acceptable copies are printed.

EXAMPLE 2

The procedure according to Example 1 is followed except that the following fountain solution is used in place of the commercial fountain:

| | Grams |
|---|---|
| P–400 polypropylene glycol (Dow Chemical Company) | 8 |
| Potassium dihydrogen phosphate | 2 |
| 1% palmitoyl N-methyl taurine (sodium salt) solution | 2.5 |
| Water, to 1 liter. | |

When using this fountain solution little or no scumming, etc. occurs. Excellent copies are obtained.

EXAMPLE 3

The procedure according to Example 2 is followed except that myristoyl N-methyl taurine (sodium salt) is utilized in place of the palmitoyl homolog. Little or no scumming occurs. Excellent prints are obtained.

EXAMPLE 4

The procedure according to Example 2 is followed except that lauroyl N-methyl taurine (sodium salt) is utilized in place of the palmitoyl homolog. No scumming, toning, etc., occurs. Extremely excellent prints are obtained.

EXAMPLE 5

The procedure according to Example 2 is followed except that lauryl sulfate (sodium salt) is utilized in place of palmitoyl N-methyl taurine. Little or no scumming occurs. Prints of high quality are obtained.

EXAMPLE 6

The procedure according to Example 5 is followed except that myristyl sulfate (sodium salt) is utilized in place of its lauryl homolog. Prints of high quality are obtained.

EXAMPLE 7

The procedure according to Example 1 using the commercial fountain is followed except that General Printing Ink Web Offset Black Ink is utilized in place of the VanSon Holland ink. Very bad scumming occurs. No acceptable prints are obtained.

EXAMPLE 8

The procedure according to Example 1 is followed except that General Printing Ink Web Offset Black Ink is utilized in place of the VanSon Holland ink and the following fountain solution is used in place of the commercial fountain solution. A concentarte containing:

| | Grams |
|---|---|
| Polyglycol P–400 (Polypropylene glycol obtained from Dow Chemical Co., Sp. Gr. 1,009 at 20° C. | 128 |
| Citric acid | 32 |
| Sodium citrate, U.S.P. gran | 32 |
| Lauroyl N-methyl taurine (sodium salt) | 0.8 |
| Water | 851.0 |

is diluted with about 30 parts water to 1 part solution to form the fountain solution. Excellent prints are obtained with little or no scumming appearing.

EXAMPLE 9

The procedure according to Example 8 is followed except that lauryl sulfate is utilized in place of the taurine compound. Prints of high quality are obtained.

EXAMPLE 10

The procedure according to Example 8 is followed except that the following fountain solution is utilized:

| | Grams |
|---|---|
| Polyglycol P–1200 (molecular weight averages about 1200) | 1.5 |
| Citric acid (about) | 1 |
| Sodium citrate | 1 |
| Lauroyl N-methyl taurine | 0.05 |
| Water, to 1 liter. | |

in place of the P–400 (molecular weight average about 400) diluted fountain solution. High-quality reproductions are obtained.

EXAMPLE 11

The procedure according to Example 8 is followed except that Carbowax 1200, a polyethylene glycol (molecular weight about 1,200), is substituted for Polyglycol P–400. High quality reproductions are obtained.

EXAMPLE 12

The procedure according to Example 8 is followed except that Carbowax 6000 (polyethylene glycol having an average molecular weight of about 6,000) is employed in place of the Polyglycol P–400. High-quality reproductions are obtained.

EXAMPLE 13

A lithographic element is prepared, exposed, and processed in accordance with the teachings of U.S. Pat. No. 3,146,105. The plate is positioned on an A. B. Dick Aquamatic press (a high-speed press) and rewet with a solution of 40 grams polypropylene glycol P–400 per liter of water. The press is then operated using VanSon Holland ink and a commercial glycerine-phosphate fountain solution. Bad scumming appears and no acceptable copies are obtained.

EXAMPLE 14

The procedure according to Example 13 is followed except that the fountain solution according to Example 8 is utilized in place of the commercial fountain. The fountain worked effectively for long runs and the press produces high-quality reproductions.

EXAMPLE 15

The procedure of Example 13 is used except that in place of the commercial fountain solution the following fountain is employed:

| | Grams |
|---|---|
| Carbowax 1500 (polypropylene glycol) | 5 |
| Dow P–1200 (polypropylene glycol) | 0.5 |
| Potassium dihydrogen phosphate | 1 |
| 1% Dupanol ME solution (technical grade of sodium lauryl sulfate in water) | 2.5 |

Good results are obtained with little or no scumming appearing.

EXAMPLE 16

The procedure of Example 15 is followed except that in place of the low-tack ink (VanSon Holland), a high-tack ink (Speed King Jet Halftone Black) is used. High-quality reproductions are obtained.

EXAMPLE 17

The procedure of Example 14 is followed except that in place of the low-tack ink, high-tack ink of Example 16 is used. High-quality reproductions are obtained.

EXAMPLE 18

The procedures outlined in Example 1 are followed except that the following solution is utilized in place of the commercial fountain solution:

| | Grams |
|---|---|
| Polyglycol P–400 | 6 |
| Boric acid | 10 |
| Water, to 1 liter. | |

Although reproductions utilizing this solution are free of scumming, the images are broken, fine detail is missing. The same appears true when other high-tack inks are employed.

EXAMPLE 19

The procedure according to Example 18 is followed except that 2.5 grams of a 1% by weight aqueous solution of lauroyl N-methyl taurine is added to the fountain. Reproductions were found to be of high quality, i.e., free of scumming and of desired density.

The invention has been described in detail with particular reference to preferred embodiments thereof, but it wil be understood that variations and modifications can be effected within the spirit and scope of the invention as described hereinabove, and as defined in the appended claims.

I claim:

1. In a method for lithographic printing from gelatino-silver halide sensitized printing plate the steps of exposing the printing plate to an image to be printed, to form a developable silver halide image in an activator bath, developing a silver halide image in an activator bath to render image areas oleophilic, moistening the printing plate with a suitable aqueous solution, supplying ink to the moistened printing plate and printing, the improvement which comprises contacting the surface of the printing plate with an aqueous solution comprising polyglycols having average molecular weights in the range of from about 400 to about 6,000 and an anionic surfactant containing a sulfo acid, subsequent to processing the exposed plate and prior to supplying ink thereto.

2. The method of claim 1 wherein said aqueous solution comprises from about 0.1 to about 1 percent by weight of said polyglycols and from about .001 to about .01 percent by weight of said anionic surfactant.

3. In a method according to claim 2 wherein the polyglycol is polypropylene glycol.

4. In a method as in claim 2 wherein the aqueous solution also comprises at least one anionic surfactant containing an alkyl moiety having from 11–16 carbon atoms and a sulfo acid moiety.

5. In a method as in claim 4 wherein the anionic surfactant is selected from the group consisting of salts of alkyl sulfates and alkanoyl N-methyl taurine wherein the alkyl and alkanoyl contain 12–16 carbon atoms.

6. In a method as in claim 5 wherein the anionic surfactant is the sodium salt of lauroyl N-methyl taurine.

7. An aqueous solution consisting essentially of from about 0.1 to about 1 percent by weight of polyglycols having an average molecular weight of from about 400 to about 6,000 and from about .001 to about .01 percent by weight of an anionic surfactant which is a salt containing an alkyl moiety of from 11–16 carbon atoms and a sulfo-acid moiety.

8. An aqueous solution as in claim 7 wherein the anionic surfactant is a member selected from the group consisting of salts of alkanoyl N-methyl taurine and alkyl sulfates wherein the alkyl and alkanoyl groups each contain 12–16 carbon atoms.

9. An aqueous solution as in claim 7 wherein the anionic surfactant is a salt of alkanoyl N-methyl taurine wherein the alkanoyl group is a straight chain of from 12–16 carbon atoms.

10. An aqueous solution as in claim 7 wherein the anionic surfactant is a salt of lauroyl N-methyl taurine.

11. An aqueous solution as in claim 10 wherein the anionic surfactant is the sodium salt of lauroyl N-methyl taurine and the polyglycol is polypropylene glycol having an average molecular weight of about 400–1,200 and the solution further contains a buffer system to maintain the pH of the solution at about 3–5.

References Cited

UNITED STATES PATENTS

| | | | |
|---|---|---|---|
| 3,019,105 | 1/1962 | Adams | 96—33 |
| 3,029,727 | 4/1962 | Gumbinner | 96—33X |
| 3,309,990 | 3/1967 | Klupfel | 96—33 |
| 3,313,233 | 4/1967 | Uhlig | 96—33X |
| 3,334,584 | 8/1967 | Sites | 96—33X |
| 3,354,824 | 11/1967 | Griffith | 101—451 |
| 3,359,101 | 12/1967 | Ito | 96—33X |

WILLIAM D. MARTIN, Primary Examiner

W. R. TRENOR, Assistant Examiner

U.S. Cl. X.R.

101—451, 465; 106—2